Figure 1:
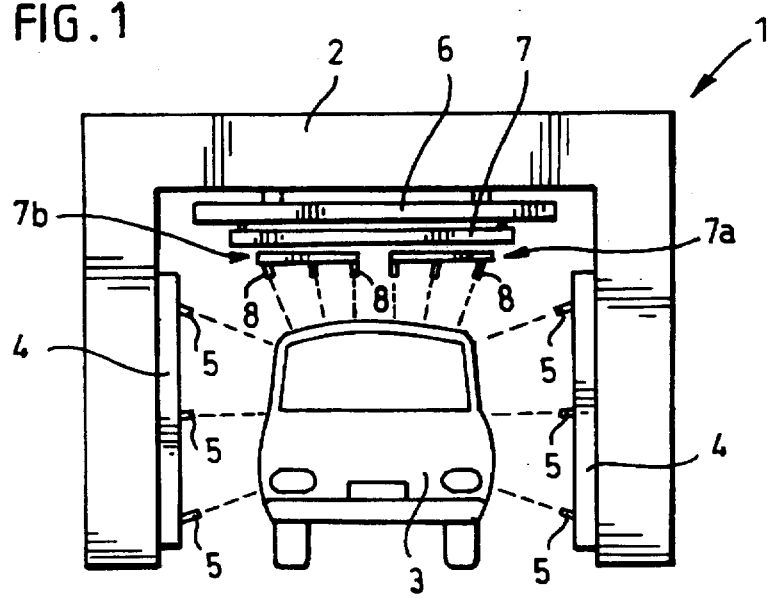

US005725003A

United States Patent [19]

Jaakkonen

[11] Patent Number: 5,725,003
[45] Date of Patent: Mar. 10, 1998

[54] VEHICLE WASHING APPARATUS

[75] Inventor: Seppo Jaakkonen, Moisio, Finland

[73] Assignee: Tammermatic Ltd., Tampere, Finland

[21] Appl. No.: 634,720

[22] Filed: Apr. 19, 1996

[30] Foreign Application Priority Data

Apr. 21, 1995 [FI] Finland ................................ 951923

[51] Int. Cl.$^6$ ................................ B08B 3/02
[52] U.S. Cl. ................ 134/123; 134/181; 134/172; 239/264
[58] Field of Search ................ 134/45, 123, 158, 134/201, 172, 181; 239/264; 15/DIG. 2

[56] References Cited

U.S. PATENT DOCUMENTS

| 3,261,369 | 7/1966 | Thiele ............................ 134/123 |
|---|---|---|
| 3,339,565 | 9/1967 | Williams ........................ 134/123 |
| 3,391,701 | 7/1968 | Richardson et al. ............. 134/123 |
| 4,895,307 | 1/1990 | Swinehart et al. . |
| 4,972,862 | 11/1990 | Belanger et al. . |
| 5,076,304 | 12/1991 | Mathews ......................... 134/123 |
| 5,161,557 | 11/1992 | Scheiter, Jr. . |
| 5,188,293 | 2/1993 | Burton . |
| 5,197,673 | 3/1993 | Sullivan ......................... 239/264 |
| 5,255,695 | 10/1993 | Downey . |
| 5,280,855 | 1/1994 | Rietsch, Jr. ..................... 239/364 |
| 5,291,906 | 3/1994 | White . |
| 5,363,865 | 11/1994 | Brabd ............................. 134/123 |

FOREIGN PATENT DOCUMENTS

| 122563 | 4/1931 | Australia ........................ 134/123 |
|---|---|---|
| 891799 | 1/1989 | Finland . |
| 1051333 | 9/1953 | France ........................... 134/123 |
| 1007196 | 4/1957 | Germany ........................ 134/123 |
| 40 27 613A1 | 3/1992 | Germany . |
| 224330 | 11/1968 | U.S.S.R. ........................ 134/123 |
| 493385 | 2/1976 | U.S.S.R. ........................ 134/123 |

*Primary Examiner*—Frankie L. Stinson
*Attorney, Agent, or Firm*—Burns, Doane, Swecker & Mathis LLP

[57] ABSTRACT

A vehicle washing apparatus comprising a frame (2), the frame (2) and the vehicle (3) to be cleaned being arranged to move with respect to each other. The frame (2) comprises lateral sprayers (5) for spraying water to the sides of the vehicle (3) and overhead sprayers for spraying water to the upper part of the vehicle (3). The overhead sprayers (8) are divided into at least two groups such that the overhead sprayers in one group swing synchronously with the overhead sprayers in the other group to the opposite direction transversely to the vehicle (3) to be cleaned. The forces generated by the water jets from the sprayers (8) thus compensate for each other, whereby the vehicle washing apparatus (1) does not swing in the lateral direction.

9 Claims, 1 Drawing Sheet

VEHICLE WASHING APPARATUS

The invention relates to a vehicle washing apparatus comprising a frame, the frame and the vehicle to be cleaned being arranged to move with respect to each other lengthwise of the vehicle to be cleaned; lateral sprayers for spraying water to clean the sides of the vehicle; and overhead sprayers for spraying water to wash the upper part of the vehicle, the overhead sprayers being arranged to swing synchronously back and forth in the transverse direction of the vehicle to be cleaned.

U.S. Pat. No. 5,161,557 teaches a brushless vehicle washing apparatus. The apparatus comprises a gantry with sprayers arranged on its lateral sides at the ends of rotary arms. In the upper part of the gantry are arranged sprayers that direct water jets to the roof of the vehicle. The sprayers are connected to a fixed crosspiece that is swung back and forth transverse to the vehicle by means of a lever swung by a hydraulic motor. When sprayers providing a point jet are used, the arrangement, however, swings heavily, whereby the cleaning result is uneven. On the other hand, sprayers providing a fan-like jet do not direct a sufficiently strong spray to the vehicle, whereby the vehicle will not be quite clean.

DE 40,27,613 teaches a brushless vehicle washing apparatus with a spraying unit arranged in the upper part to clean the roof of the vehicle. The spraying unit comprises sprayers at the ends of two arms, and the unit can be moved in the transverse direction of the vehicle. Further, the unit can be inclined in two different directions by means of two hydraulic cylinders. The mechanism for controlling the spraying unit is thus complicated and cumbersome. Also, the cleaning process is slow, since the spraying unit must also be moved in the transverse direction of the vehicle.

FI 891,799 teaches a vehicle washing apparatus comprising several spraying nozzles that are arranged adjacent to one another in the transverse direction of the vehicle and that can sweep over the vehicle in the longitudinal direction. The spraying nozzles are arranged as rotor sprayers providing a point spray at a sharp angle inclined maximally by about 30° in relation to the rotation axis of the rotor sprayer. The sprayers are interconnected with inflexible pipes in the longitudinal direction and can be moved back and forth transversely to the vehicle. Rotating rotor sprayers are mechanically complicated, and so they break easily and are expensive. Also, they are difficult and complicated to orient and control. Further, in the solution described in the publication the back and forth movement of the sprayers requires heavy supporting structures.

The object of the present invention is to provide a vehicle washing apparatus in which the above drawbacks have been eliminated.

The vehicle washing apparatus of the invention is characterized in that the overhead sprayers are arranged in at least two groups, the overhead sprayers of one group being arranged to swing synchronously with the overhead sprayers of the other group to the opposite direction, and that the overhead sprayers belonging to one and the same group are mechanically interconnected.

The essential idea of the invention is that the sprayers for washing the roof of the vehicle are divided into different groups, whereby the sprayers of one group are swung synchronously with the sprayers of the other group to the opposite direction, and that the sprayers are mechanically interconnected.

The advantage of the invention is that when the sprayers are made to swing synchronously to the different directions, the forces generated by their sprays and the inertia forces compensate for each other, whereby the washing apparatus does not swing essentially in the lateral direction.

Figure 2:
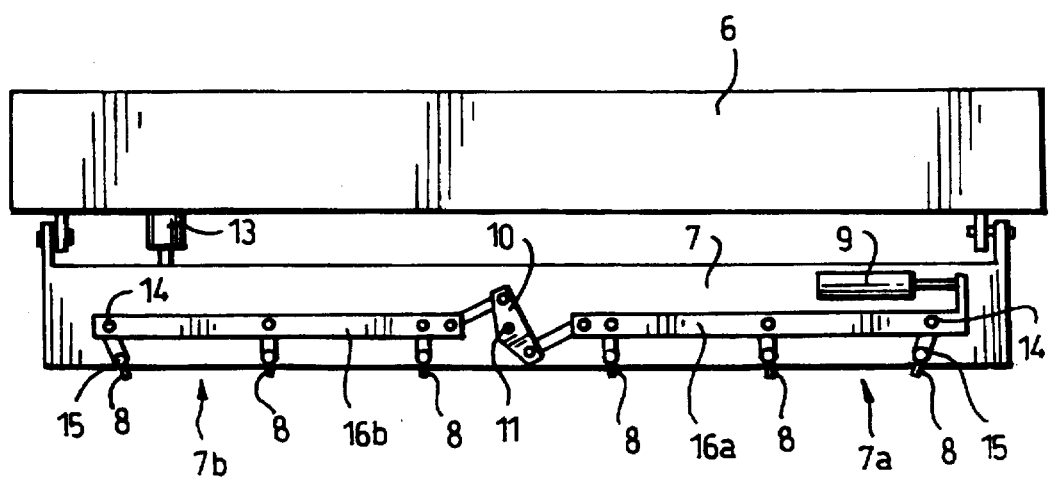

The invention will be described in greater detail in the attached drawings, in which FIG. 1 shows a schematic view of a vehicle washing apparatus according to the invention, and FIG. 2 shows an embodiment of an overhead carrier of the apparatus according to FIG. 1.

FIG. 1 shows a schematic view of a vehicle washing apparatus 1 according to the invention. The vehicle washing apparatus 1 comprises a frame 2 of the shape of a gantry. The frame 2 may be arranged to move e.g. on rails lengthwise of the vehicle 3 to be cleaned. On the other hand, the frame 2 may also be stationary, whereby the vehicle 3 is arranged to move in relation to the frame 2. To the frame 2 are secured lateral sprayer supports 4, to which are secured lateral sprayers 5 for cleaning the sides of the vehicle 3. The lateral sprayers 5 produce a point water jet, and they are arranged to move such that the essentially overlapping lateral sprayers 5 turn synchronously up and down, preferably at an angle of about 60°. The lateral sprayers 5 and their movement are, as such, fully known, and so they are not discussed in greater detail herein. At the lateral sprayer supports 4 may also be arranged e.g. drying units and chemical units in a manner known per se. An overhead carrier 6 is arranged in the frame 2 for cleaning of the roof, the carrier moving in the vertical direction, following the contour of the vehicle in a manner known per se or being installed in the upper part of the frame 2 in a manner known per se. The overhead carrier 6 comprises an overhead sprayer support 7 and optionally also drying and chemical units. The structure and movements of the overhead carrier 6 are fully known per se, and so they will not be discussed in greater detail herein. In the overhead sprayer support 7 are arranged overhead sprayers 8. The overhead sprayers 8 provide a point water jet, and they are arranged to turn in the transverse direction of the vehicle 3 to be cleaned, typically at an angle of about 60°. The overhead sprayers 8 are arranged to move synchronously. Further, the overhead sprayers 8 of the first group 7a of overhead sprayers are arranged to move in the opposite direction to the overhead sprayers 8 of the second group 7b of overhead sprayers. In other words, when the overhead sprayers 8 in the first group 7a move to the right in the figure, the overhead sprayers 8 in the other group 7b move to the left, and vice versa. Since the overhead sprayers 8 are mechanically connected to the overhead sprayer support 7, the opposite forces generated by the water jets from the mobile overhead sprayers 8 in the different groups compensate for each other. The overhead support 6 and the frame 2 of the vehicle washing apparatus 1 do thus not swing essentially in the lateral direction.

The distance between the sprayers and the swinging angle of the sprayers are naturally adjusted such that the water jets cover the entire vehicle to be cleaned. Those overhead sprayers 8 of the first and second group 7a and 7b of overhead sprayers which are nearest to each other are arranged such that their water jets go past each other and do not collide at any point. If the water jets collided with each other, they would lose an essential part of their effect, which would impair the cleaning result.

In a preferred embodiment, the lateral sprayers 5 and overhead sprayers 8 may operate in turns, whereby the pressure water system can be designed to be smaller. Further, the lateral sprayer supports 4 and/or overhead sprayer supports 7 can be turned lengthwise of the vehicle 3 such that in the longitudinal direction the water jets are also directed to the vehicle 3 obliquely. This further improves the cleaning result. The overhead carrier 6 and the overhead sprayer support 7 can be combined, whereby only the overhead carrier 6 will be turned.

FIG. 2 shows an embodiment of an overhead carrier 6 of a vehicle washing apparatus 1 according to the invention. The reference numbers used in FIG. 2 correspond to those used in FIG. 1. For the sake of clarity, FIG. 2 does not show water supply pipes leading to the overhead sprayers 8, nor chemical nor drying units optionally arranged in the overhead carrier, nor means for controlling and moving the overhead carrier 6. The overhead sprayers 8 are connected to the rigid overhead sprayer support 7 by means of joints 15 and to overhead sprayer rods 16a and 16b by means of joints 14, so that as the overhead sprayer rods 16a and 16b move back and forth, the overhead sprayers 8 swing synchronously about the joints 15 connected to the overhead sprayer support 7. For the sake of clarity, only some of the joints 14 and 15 are numbered in FIG. 2. The overhead sprayers 8 secured to the first overhead sprayer rod 16a form the first group 7a of overhead sprayers, and the overhead sprayers 8 secured to the second overhead sprayer rod 16b form the second group 7b of overhead sprayers. The first overhead sprayer rod 16a is swung back and forth with a swinging device 9. The swinging device 9 may be e.g. a pneumatic cylinder, hydraulic cylinder, reciprocating rod, spindle motor, or any other such actuator. The first overhead sprayer rod 16a and the second overhead sprayer rod 16b are connected to a reversing lever 10 by means of levers and joints, the reversing lever being arranged to turn about a reverse joint 11 such that when the first overhead sprayer rod 16a moves to the left in the figure, the reversing lever makes the second overhead sprayer rod 16b move to the right, and vice versa. Since all the overhead sprayers 8 are mechanically connected to the overhead sprayer support 7, the fact that the overhead sprayers of different groups swing to different directions compensates for the forces of the water jets and the inertia forces that tend to swing the overhead carrier 6.

The overhead sprayer support 7 or the overhead carrier 6 can be turned lengthwise of the vehicle by a swinging cylinder 13 or some other such mechanism.

The drawings and the specification are intended only to illustrate the idea of the invention. The invention may vary in its details within the scope of the claims. For example, the swinging of the different groups of overhead sprayers to opposite directions can also be implemented e.g. such that the first group 7a of overhead sprayers and the second group 7b of overhead sprayers are each swung by a different actuator, the actuators being synchronized such that the overhead sprayers 8 in the different groups 7a, 7b of overhead sprayers swing to the opposite directions. Further, the number and distance of the sprayers may vary according to the need. Furthermore, the overhead sprayers 8 can also be divided into more than two groups. The spraying direction can be changed in the longitudinal direction of the vehicle such that the spraying can take place at many different angles, the change being effected by turning the overhead sprayer support 7 or the overhead carrier 6.

I claim:

1. A vehicle washing apparatus comprising a frame, the frame and the vehicle to be cleaned being arranged to move with respect to each other lengthwise of the vehicle to be cleaned; lateral sprayers for spraying water to clean the sides of the vehicle; and overhead sprayers for spraying water to wash the upper part of the vehicle, the overhead sprayers being arranged to swing synchronously back and forth in the transverse direction of the vehicle to be cleaned, wherein the overhead sprayers are arranged in at least two groups, the overhead sprayers of one group being arranged to swing synchronously with the overhead sprayers of the other group to the opposite direction, the at least two groups being arranged in adjacent positions in the transverse direction of the vehicle to be cleaned, and the overhead sprayers belonging to one and the same group are mechanically interconnected.

2. A vehicle washing apparatus according to claim 1, wherein the vehicle washing apparatus comprises a first overhead sprayer rod, to which a first group of overhead sprayers is secured so that said sprayers form a first group of overhead sprayers, and a second overhead sprayer rod, to which a second group of overhead sprayers is secured so that said sprayers form a second group of overhead sprayers, and the first overhead sprayer rod is arranged to be swung by a swinging device, and the first overhead sprayer rod and the second overhead sprayer rod are connected to each other by a reversing lever that is arranged to turn about a reverse joint such that when the first overhead sprayer rod moves, the reversing lever moves the second overhead sprayer rod to the opposite direction.

3. A vehicle washing apparatus according to claim 2, wherein at least that overhead sprayer of the first group of overhead sprayers which is nearest to the second group of overhead sprayers and that overhead sprayer of the second group of overhead sprayers which is nearest to the first group of overhead sprayers are arranged such that their water jets pass one another.

4. A vehicle washing apparatus according to claim 1, wherein the overhead sprayers are sprayers that provide a point spray.

5. A vehicle washing apparatus according to claim 1, wherein the overhead sprayers can be turned lengthwise of the vehicle.

6. A vehicle washing apparatus according to claim 1, wherein the at least two groups lie substantially on a common axis.

7. A vehicle washing apparatus according to claim 1, wherein the overhead sprayers of each group are adapted to swing in the same direction.

8. A vehicle washing apparatus according to claim 1, wherein the sprayers in each group are arranged in adjacent positions in the transverse direction of the vehicle to be cleaned.

9. A vehicle washing apparatus comprising:
a frame, the frame and the vehicle to be cleaned being arranged to move with respect to each other lengthwise of the vehicle to be cleaned;
lateral sprayers for spraying water to clean the sides of the vehicle; and
overhead sprayers for spraying water to wash the upper part of the vehicle, the overhead sprayers being arranged to swing synchronously back and forth in the transverse direction of the vehicle to be cleaned, the overhead sprayers being arranged in at least two groups, the overhead sprayers of each of the two groups being adapted to swing in the same transverse direction, the overhead sprayers of one group being arranged to swing synchronously with the overhead sprayers of the other group to the opposite direction, the two groups lying substantially on a common axis, and the overhead sprayers belonging to one and the same group are mechanically interconnected.

* * * * *